US008242717B2

(12) United States Patent
Van Herpen et al.

(10) Patent No.: US 8,242,717 B2
(45) Date of Patent: Aug. 14, 2012

(54) LIGHT OUTPUT DEVICE

(75) Inventors: Maarten Marinus Johannes Wilhelmus Van Herpen, Eindhoven (NL); Petrus Johannes Bremer, Eindhoven (NL); Coen Theodorus Hubertus Fransiscus Liedenbaum, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 194 days.

(21) Appl. No.: 12/670,695

(22) PCT Filed: Jul. 25, 2008

(86) PCT No.: PCT/IB2008/052986
§ 371 (c)(1),
(2), (4) Date: Jan. 26, 2010

(87) PCT Pub. No.: WO2009/016561
PCT Pub. Date: Feb. 5, 2009

(65) Prior Publication Data
US 2010/0188005 A1    Jul. 29, 2010

(30) Foreign Application Priority Data

Aug. 2, 2007  (EP) .................................. 07113668

(51) Int. Cl.
*H05B 37/00*  (2006.01)
(52) U.S. Cl. ..... 315/318; 315/312; 315/320; 315/169.1; 362/543; 362/227; 362/234; 362/249.05; 257/37; 257/88; 257/E25.026; 257/E25.027; 257/E33.057; 438/455; 438/107; 438/108
(58) Field of Classification Search .... 315/169.1–169.3, 315/210, 216, 312, 318, 320; 362/227, 240, 362/234, 249.02, 249.05, 543, 545, 611, 362/630; 257/37, 40, 88, 99, E25.02, E25.026, 257/E25.027, E33.056, E33.057; 438/106–108, 438/111, 455, 458
See application file for complete search history.

(56) References Cited

U.S. PATENT DOCUMENTS

| 5,218,351 A | 6/1993 | Hashikawa |
| 6,239,716 B1 * | 5/2001 | Pross et al. ................. 340/815.4 |

(Continued)

FOREIGN PATENT DOCUMENTS

EP    0967590 A1    12/1999
(Continued)

OTHER PUBLICATIONS

Hara: "Sony Shows Flex Twist on Organic LED Displays"; EETIMES EU, 2 Page Article, Downloaded From http://eetimes.eu/uk/showArticle.jhtml, on Jun. 6, 2007.

(Continued)

*Primary Examiner* — Haiss Philogene
(74) *Attorney, Agent, or Firm* — Mark L. Beloborodov

(57) ABSTRACT

A light output device comprises a substrate arrangement comprising a plurality of light source circuits integrated into the structure of the substrate arrangement. Each light source circuit comprises a light source device arrangement (4) having two terminals and a transistor circuit (7). Each light source circuit is supplied with power from an associated pair the power connections (10,11,14,15,20), and at least two light source circuits (4,7) share the same pair of power connections. A set of control connections (18) are provided for receiving external control signals for controlling the transistor circuits (7). A set of non-overlapping electrodes (10,11, 14,15,18,20) provide the internal connections between the power connections, the light source device terminals and the transistor circuits, and each light source device is individually independently controllable.

18 Claims, 4 Drawing Sheets

U.S. PATENT DOCUMENTS

| | | | |
|---|---|---|---|
| 7,282,734 B2* | 10/2007 | Yamazaki et al. | 257/40 |
| 7,316,496 B2* | 1/2008 | Wu et al. | 362/561 |
| 7,504,616 B2* | 3/2009 | Nakamura et al. | 250/214.1 |
| 7,745,838 B2* | 6/2010 | Lefevre | 257/88 |
| 2006/0275599 A1 | 12/2006 | Lefevre | |
| 2007/0164293 A1* | 7/2007 | Hamano et al. | 257/79 |
| 2010/0096647 A1* | 4/2010 | Van Herpen et al. | 257/91 |
| 2010/0110675 A1* | 5/2010 | Van Herpen et al. | 362/234 |
| 2010/0244695 A1* | 9/2010 | Van Herpen et al. | 315/51 |
| 2010/0265707 A1* | 10/2010 | Van Herpen et al. | 362/235 |
| 2011/0211345 A1* | 9/2011 | De Boer et al. | 362/235 |

FOREIGN PATENT DOCUMENTS

| | | | |
|---|---|---|---|
| EP | 1437215 A1 | 7/2004 | |
| WO | 0182378 A1 | 11/2001 | |
| WO | 2008126003 A1 | 10/2008 | |

OTHER PUBLICATIONS

Embedded Computing Design: "New Research Could Lead to 'Invisible' Electronics"; 2 Page Article, Downloaded From http://www.embedded-computing.com/news/db/include/print.php?4951, on Jun. 5, 2007.

Bush: "Organic LEDs are on the Way"; Electronics Weekly, Nov. 11, 2004, 5 Page Document, Downloaded From http://www.electronicsweekly.com/Articles/Article.aspx?liArticleID=33567, on Jun. 6, 2007.

* cited by examiner

LIGHT OUTPUT DEVICE

FIELD OF THE INVENTION

This invention relates to light output devices, in particular using discrete light sources associated with a transparent substrate structure.

BACKGROUND OF THE INVENTION

One known example of this type of lighting device is a so-called "LED in glass" device. An example is shown in FIG. 1. Typically a glass plate is used, with a transparent conductive coating (for example ITO) forming electrodes. The conductive coating is patterned in order to make the electrodes, that are connected to a semiconductor LED device. The assembly is completed by laminating the glass, with the LEDs inside a thermoplastic layer (for example polyvinyl butyral, PVB).

Applications of this type of device are shelves, showcases, facades, office partitions, wall cladding, and decorative lighting. The lighting device can be used for illumination of other objects, for display of an image, or simply for decorative purposes.

One problem with this type of device is that it is difficult to provide a structure which enables individual LEDs in the glass to be turned on and off, for example in order to display an image, or a dynamic pattern. This is difficult, because a two-dimensional pattern of transparent electrodes is desired, but crossovers need to be avoided if the layer structure is to be kept simple. if individual wires are used for each LED (instead of a two dimensional pattern), this results in very high wire resistances (for example ITO electrodes), leading to high electrical losses in these wires.

It is an object of the invention to provide independent control of the light source devices but with a simple conductor pattern.

SUMMARY OF THE INVENTION

According to the invention, there is provided a light output device comprising:

a substrate arrangement;

a plurality of light source circuits integrated into the structure of the substrate arrangement, each light source circuit comprising a light source device arrangement having two terminals and a transistor circuit;

a set of power connections for receiving external power, wherein each light source circuit is associated with a pair of the power connections for the supply of power to the light source circuit, and wherein at least two light source circuits share the same pair of power connections;

a set of control connections for receiving control signals for controlling the respective transistor circuits; and a set of non-overlapping electrodes which provide the internal connections between the power connections, the light source device terminals and the transistor circuits, wherein each light source device arrangement is individually independently controllable.

This arrangement provides individually addressable light source circuits, using non-overlapping electrodes so that a single electrode layer can be used, but which reduces the number of power connections to the plurality of light source circuits. This enables the width of the power connections to be increased for a given pitch between light source circuits, or enables the pitch to be reduced. Transistor circuits enable the independent control to be achieved despite the shared power connections.

Each light source device arrangement can comprise a single light source device and each transistor circuit can comprise a single transistor. This provides a simple architecture.

Each transistor can comprise a MOSFET with its gate connected to a respective control connection.

In one example, each transistor can have its source and drain connected to respective power connections, with one of the source and drain connected to a power connection through the transistor. If these are side by side, the power connections can be shared and doubled in width, and narrow control lines can be used to control the transistors (because of the low current requirement).

In another example, the at least two light source circuits which share the same pair of power connections can be connected in series between the power connections, with each transistor connected in parallel across the light source device arrangement. In this arrangement, a current path is set through a chain of light source device arrangements, and the parallel transistors enable the controlled light source device arrangement to be bypassed.

Preferably in this case, a power source arrangement comprises a current source for each set of light source circuits which share the same pair of power connections. In this way, no matter how many light source device arrangements are connected in series, they can all be illuminated. A control circuit can then be provided for controlling the transistor circuits, with the control levels applied to the transistors being selected in dependence on which light source circuits are turned on and which are turned off. This can be required as the voltage levels are not static.

In all examples, a control circuit can be provided for dimming the light intensity of a light source device using duty cycle control.

Preferably, one of the power connections is shared between all light source circuits.

The light source device arrangements can comprise an LED device or a group of LED devices, for example inorganic LEDs, organic LEDs, polymer LEDs or a laser diodes.

The invention also provides a lighting system comprising a light output device of the invention, and a lighting controller for controlling the signals provided to the control circuits.

It is noted that the invention relates to all possible combinations of features recited in the claims.

BRIEF DESCRIPTION OF THE DRAWINGS

Examples of the invention will now be described in detail with reference to the accompanying drawings, in which.

The same reference numbers are used to denote similar parts in the different figures.

DETAILED DESCRIPTION

Figure 1:
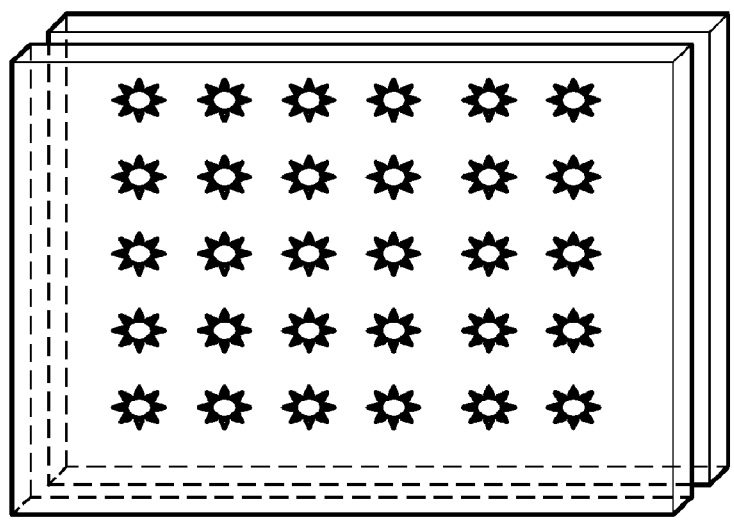
FIG. 1 shows a known LED in glass illumination device.
Figure 2:
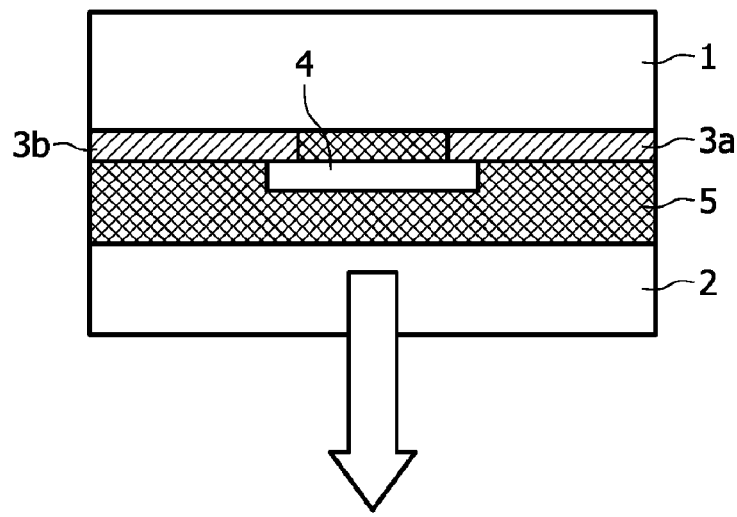
FIG. 2 shows a single LED of the device of FIG. 1 in more detail.

The structure of an LED in glass illumination device is shown in FIG. 2. The lighting device comprises glass plates 1 and 2. Between the glass plates are (semi-) transparent electrodes 3a and 3b (for example formed using ITO), and a LED 4 connected to the transparent electrodes 3a and 3b. A layer of thermoplastic material 5 is provided between glass plates 1 and 2 (for example PVB or UV resin).

The glass plates typically may have a thickness of 1.1 mm-2.1 mm. The spacing between the electrodes connecting to the LED is typically 0.01-3 mm, for example around 0.15 mm. The thermoplastic layer has a typical thickness of 0.3 mm-2 mm, and the electrical resistance of the electrodes is in the range 2-80 Ohm, or 10-30 Ohms/square.

The electrodes are preferably substantially transparent, so that they are imperceptible to a viewer in normal use of the device. If the conductor arrangement does not introduce a variation in light transmission (for example because it is not patterned, or because the pattern cannot be seen), a transparency of greater than or equal to 50% may be sufficient for the system to be transparent. More preferably, the transparency is greater than 70%, more preferably 90%, and even more preferably 99%. If the conductor arrangement is patterned (for example because thin wires are used), the transparency is preferably greater than 80%, more preferably 90%, but most preferably greater than 99%.

The electrodes can be made of a transparent material such as ITO or they can be made of an opaque material such as copper but be sufficiently thin so that they are not visible in normal use. Examples of suitable materials are disclosed in U.S. Pat. No. 5,218,351.

Figure 3:
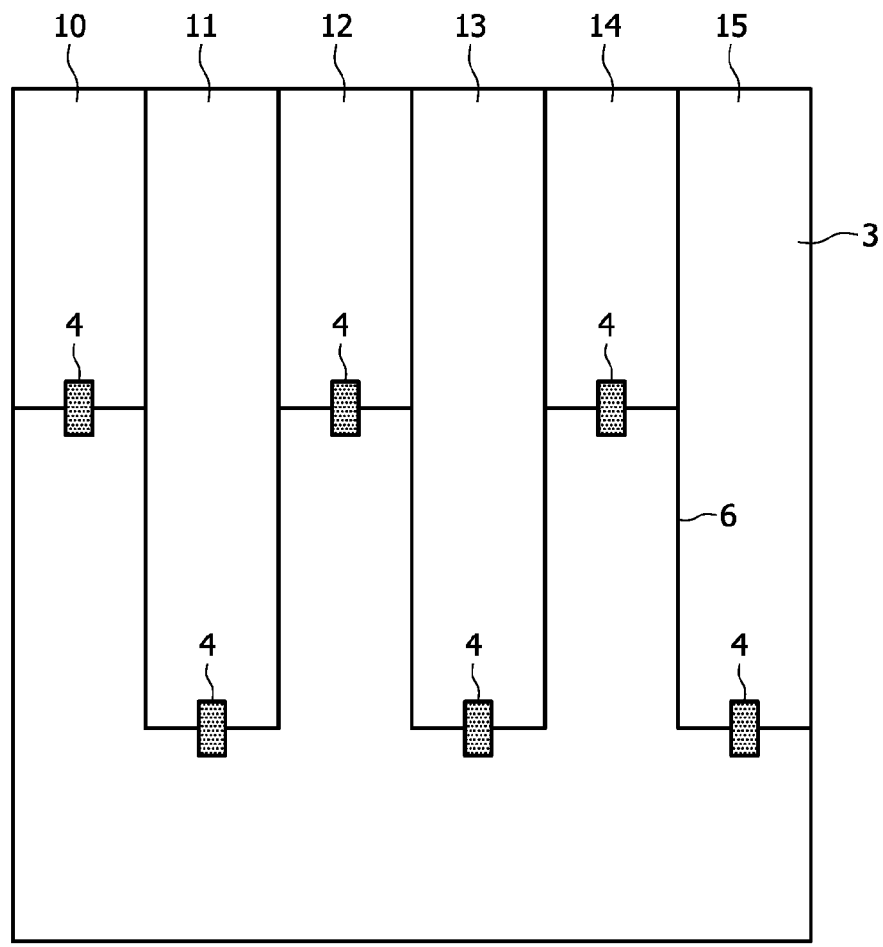
FIG. 3 shows one way to provide independent control of multiple light source devices.

FIG. 3 shows an example of an electrode pattern for controlling individual LEDs. Individual wires 10-15 are used to control several respective LEDs 4. The wires are made using a laser to make cuts 6 in a layer of electrode material 3. A problem with this solution is that the wires 10-15 are very thin, which results in a very high resistance, and accordingly in a high loss of electric power.

The current invention provides an alternative solution for controlling multiple light sources (such as LEDs) embedded in a substrate (such as glass). The control of individual light sources enables display of an image, or other dynamic pattern.

The invention provides an arrangement in which light source circuits are provided (comprising at least a light source and a control transistor) and these are supplied with power from an associated pair of power connections. At least two light source circuits share the same pair of power connections so that the number of power connections is reduced and their dimensions can be increased.

Figure 4:
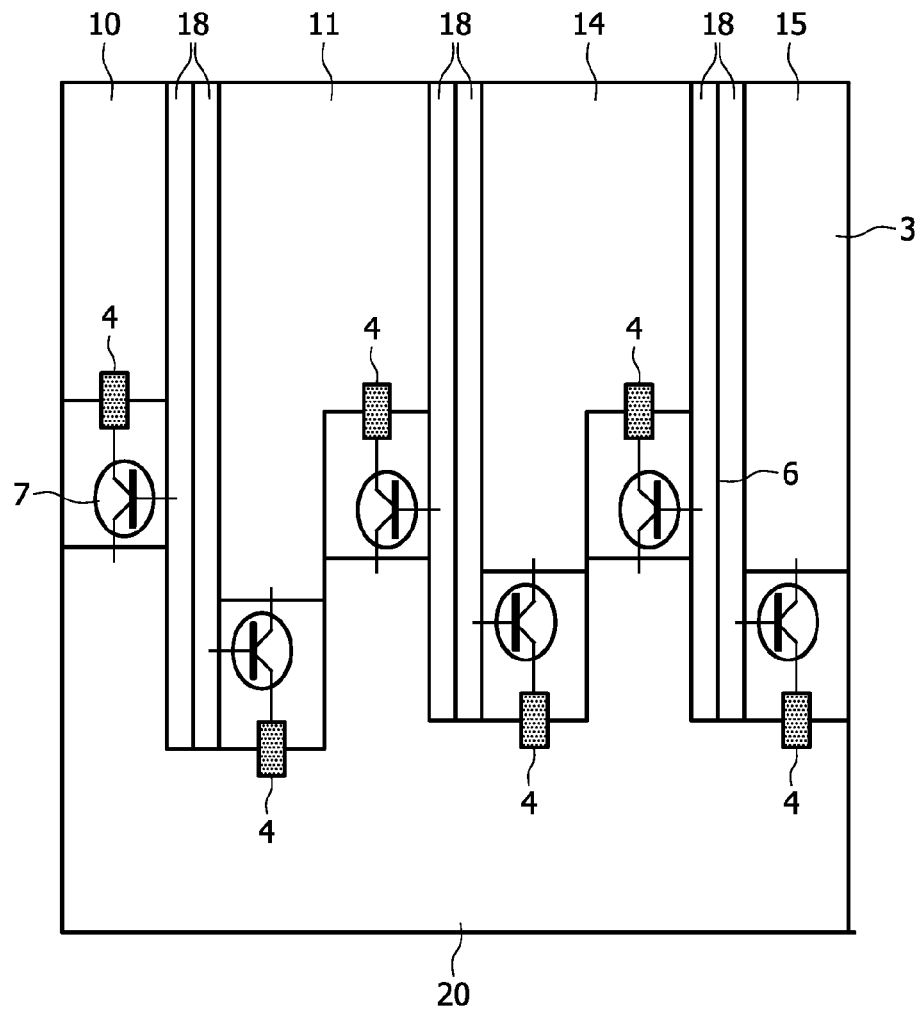
FIG. 4 shows a first example of light output device of the invention.

FIG. 4 shows a first embodiment according to the present invention. In this arrangement, each light source 4 has a transistor 7, with the gate of the transistor connected to a control wire 18. The transistor and light source together form a light source circuit.

Each light source 4 is in series between a high power rail electrode 10,11,14,15 and a shared low power rail electrode 20. Each high power rail electrode 10,11,14,15 is shared between two light sources 4, so that two adjacent light sources share the same pair of power electrodes. They can thus be made wider.

In this arrangement, for a number n of light sources, there are (n/2+1) power electrodes. As shown, these electrodes are defined by areas of conductor over the substrate, separated by score lines. These electrode areas define the internal (i.e. on-substrate) connections between the light sources, the transistors and the power and control lines. All the electrodes are defined by a single layer and are non-overlapping, and power or control signals are applied at the periphery.

The transistor 7 associated with each light source enables the light source to be isolated from one of the power conductors. In the example shown, one light source of a pair can be isolated from the high power rail and the other can be isolated from the low power rail, but this does not need to be the case. Instead, the transistors can all be associated with the high or low power rails.

The control gate of each transistor is connected to a control wire 18. By applying a voltage to control wire 18, the transistor can be switched on and off, which subsequently will turn the corresponding light source 4 on or off.

Compared to FIG. 3, the number of electrode wires has been reduced by approximately a factor of 2 (from n+1 to n/2+1), because the electrodes 11 and 12 in FIG. 3 have been merged into 11 in FIG. 4, and electrodes 13 and 14 in FIG. 3 have been merged into electrode 14.

It is also possible to reduce the number of electrodes by more than a factor of two. This is achieved by powering more light sources using the same pair of power lines, as shown in FIG. 5.

In the example shown, three light source circuits 4,7 share the same pair of power connections (although none of the three light source circuits is directly connected to both power connections). These sets of light source circuits are in columns in FIG. 5, with the high power rail at the top and the low power rail at the bottom. The light sources are connected in series between the power connections, with each transistor 7 connected in parallel across the light source 4. It will be understood that "sharing" power connections means that the same power connections are used directly or indirectly to supply power to the light source circuit.

Figure 5:
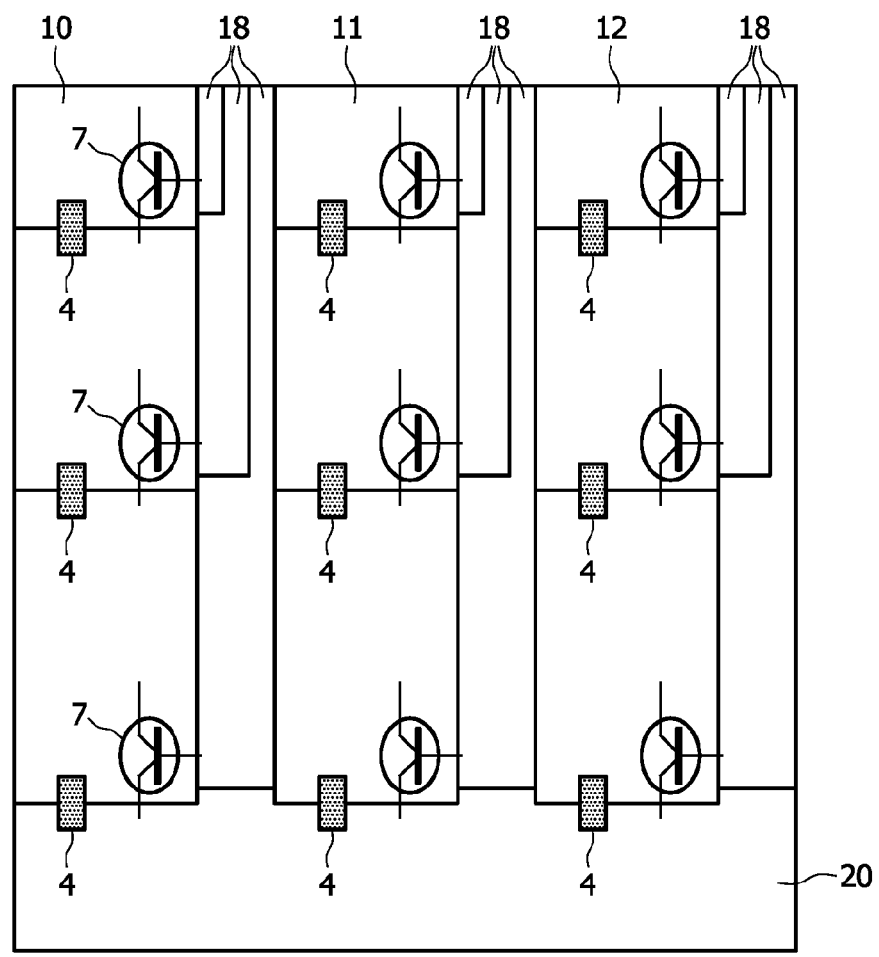
FIG. 5 shows a second example of light output device of the invention.

Thus, in each column in FIG. 5, there are three control lines 18, one for each light source circuit in the column. Electrode areas (at intermediate voltages in use) are provided between the light sources as well as defining the power connections.

In this arrangement, a current path is set through a chain of light sources 4, and the parallel transistors 7 enable the controlled light source device arrangement to be bypassed. Thus, the transistors 7 are used as dynamic shunts. This means that the transistor is connected in parallel to the LIGHT SOURCE. If the transistor is turned on, the current will flow through the transistor and the light source stays off. The transistors used are preferably MosFETs.

In this arrangement, a current flow is maintained between the power lines independently of the on/off state of the light sources, and this enables multiple light sources to be chained together, unlike in the version of FIG. 4.

In all examples, the transistors can be controlled to turn the associated light sources periodically on and off. This may be used for dimming the light source intensity using duty cycle control. For example, by turning the light source on and off with a 50% duty cycle, the light output intensity will be reduced to 50%. Preferably, this is implemented at a high frequency, such that the human eye cannot observe the intensity modulation.

In the example of FIG. 5, the reference levels required for switching the transistors depend on the number of light sources emitting light in the column, between the main reference level and the reference level of the transistor. This is because the voltage levels will depend on which light sources are turned on and which transistors are turned on.

The switching commands determining the timing and duty cycle control for the light sources can be generated by a digital circuit referenced to the main power line reference levels. Level shifters can then be used between the digital circuit and the transistors so that the digital control signals output by the digital circuit are converted into appropriate voltage levels for application to the transistor gates.

Each string of light sources in the example of FIG. 5 is preferably driven by a current source, again because the required voltage levels depend on the light sources which are turned on. A switched mode current source can be used.

In a preferred embodiment, the transistors 7 are invisible to the naked eye. This can be achieved by embedding transparent transistors, in a transparent package. Transparent transistors are known and there are existing transistor designs suitable for this application. The use of very small transistors, which are barely visible is another option.

The examples above have shown a small array of light sources. However, it will be understood that the invention is typically implemented as many LED devices, embedded in a large glass plate. A typical distance between the LEDs may be 1 cm to 10 cm, for example approximately 3 cm.

Each light source may also comprise a single LED or multiple LEDs.

The examples above use glass substrates, but it will be apparent that plastic substrates may also be used.

The LED array and the required control circuit may be merged into one integrated device, or they may be connected with a low-resistance interconnect.

In the detailed examples above, the number of electrodes is reduced by having one common electrode between the light source circuits (low power rail 20). Of course, the electrode 20 may also be split in parts, such that each high power rail electrode corresponds with one low power rail electrode. This may make driving electronics simpler.

Various modifications will be apparent to those skilled in the art.

The invention claimed is:

1. A light output device comprising:
   a substrate arrangement;
   a plurality of light source circuits integrated into the substrate arrangement, each light source circuit comprising a light source device arrangement having two terminals and a transistor circuit;
   a set of power connections for receiving external power, wherein each light source circuit is associated with a pair of the power connections for the supply of power to the light source circuit, and wherein at least two light source circuits share the same pair of power connections;
   a set of control connections for receiving control signals for controlling the respective transistor circuits; and
   a set of non-overlapping electrodes for providing internal connections between the power connections, the light source device terminals and the transistor circuits,
   wherein each light source device arrangement is individually and independently controllable.

2. A light output device as claimed in claim 1, each light source device arrangement comprises a single light source device.

3. A light output device as claimed in claim 1, wherein each transistor circuit comprises a single transistor.

4. A light output device as claimed in claim 3, wherein each transistor comprises a MOSFET.

5. A light output device as claimed in claim 1, wherein each transistor has its gate connected to a respective control connection.

6. A lighting system comprising a light output device as claimed in claim 1 and a lighting controller, wherein the substrate arrangement comprises first and second transparent substrates and an electrode arrangement embedded in the substrate arrangement, with the plurality of light source circuits connected to the electrode arrangement.

7. A light output device as claimed in claim 5, wherein the at least two light source circuits which share the same pair of power connections are connected in series between the power connections, with each transistor connected in parallel across the light source device arrangement.

8. A light output device as claimed in claim 7, further comprising a power source arrangement, comprising a current source for each set of light source circuits which share the same pair of power connections.

9. A light output device as claimed in claim 7, further comprising a control circuit for controlling the transistor circuits, wherein control levels applied to the transistors are selected in dependence on which light source circuits are turned on and which are turned off.

10. A light output device as claimed in claim 1, further comprising a control circuit for dimming the light intensity of a light source device using duty cycle control.

11. A light output device as claimed in claim 1, wherein one of the power connections is shared between all light source circuits.

12. A light output device as claimed in claim 1, wherein the electrodes comprise at least semi-transparent conductors.

13. A light output device as claimed in claim 1, wherein the light source device comprises an LED device or a group of LED devices.

14. A light output device as claimed in claim 13, wherein the light source device comprises an inorganic LED, an organic LED, a polymer LED or a laser diode.

15. A lighting system as claimed in claim 6, wherein the electrode arrangement is formed of a transparent conductive material.

16. A lighting system as claimed in claim 15, wherein the electrode arrangement is formed of a transparent metal oxide.

17. A lighting system as claimed in claim 6, further comprising a thermoplastic or resin layer provided between the substrates.

18. A lighting system as claimed in claim 6, wherein the transistors of the transistor circuits comprise a transparent transistor in a transparent package.

* * * * *